(12) United States Patent
Dekarske (10) Patent No.: US 12,336,510 B2
(45) Date of Patent: Jun. 24, 2025

(54) RETRACTABLE DOG LEASH WITH GRAVITY LOCKING MECHANISM

(71) Applicant: David Dekarske, Lancaster, SC (US)

(72) Inventor: David Dekarske, Lancaster, SC (US)

( * ) Notice: Subject to any disclaimer, the term of this patent is extended or adjusted under 35 U.S.C. 154(b) by 122 days.

(21) Appl. No.: 17/898,717

(22) Filed: Aug. 30, 2022

(65) Prior Publication Data

US 2024/0065229 A1 Feb. 29, 2024

(51) Int. Cl.
*A01K 27/00* (2006.01)

(52) U.S. Cl.
CPC .......... *A01K 27/004* (2013.01); *A01K 27/005* (2013.01)

(58) Field of Classification Search
CPC .... A01K 27/004; A01K 27/005; A01K 89/00; A01K 89/0113; F16B 2200/83; F16B 45/023; B65H 2601/22; B65H 75/4431
USPC .......................... 119/797; 242/384.5; 24/303
See application file for complete search history.

(56) References Cited

U.S. PATENT DOCUMENTS

| | | | | |
|---|---|---|---|---|
| 955,980 A * | 4/1910 | McDougall | ........ | B65H 75/4434 242/385.1 |
| 2,337,970 A * | 12/1943 | Cassell | ................ | A01K 27/005 119/799 |
| 2,424,368 A * | 7/1947 | Oberdorf | .............. | A01K 27/004 242/379.2 |
| 2,593,940 A * | 4/1952 | Meter | ................... | A01K 27/005 267/74 |
| 2,647,703 A * | 8/1953 | Hayes | .................. | A01K 27/004 119/796 |
| 3,189,004 A * | 6/1965 | Sinclair | .................... | A01K 1/04 119/789 |
| 3,198,175 A * | 8/1965 | Dean | ..................... | A01K 27/004 119/796 |
| 3,250,253 A * | 5/1966 | Galin | ................... | A01K 27/001 242/381.6 |
| 3,693,596 A * | 9/1972 | Croce | ................... | A01K 27/004 119/796 |
| 3,937,418 A * | 2/1976 | Critelli | ................. | A01K 27/004 119/796 |
| 4,197,817 A * | 4/1980 | Crutchfield | .......... | A01K 27/004 119/794 |
| 5,377,626 A * | 1/1995 | Kilsby | ................. | A01K 27/004 119/796 |
| 6,237,540 B1 * | 5/2001 | Vandracsek | .......... | A01K 27/003 119/797 |

(Continued)

FOREIGN PATENT DOCUMENTS

| AU | 2004100257 A4 * | 5/2004 | .......... A01K 27/003 |
|---|---|---|---|
| DE | 19930092 A1 * | 1/2001 | .......... A01K 27/004 |

(Continued)

*Primary Examiner* — Morgan T Jordan
*Assistant Examiner* — Angelica Alejandra Almeida Bonnin
(74) *Attorney, Agent, or Firm* — Jeffrey C. Watson, Esq.; Grell & Watson Patent Attorneys LLC (57) ABSTRACT

A retractable dog leash. The dog leash includes a cylindrical housing having a housing front cover and housing rear cover. A spring-loaded retraction device is positioned in the housing adjacent to the rear cover and a linear compression spring is positioned between the spring-loaded retraction device and the front cover. The spring-loaded retraction device includes a gravity locking device for locking the dog leash. A cord is connected to the spring-loaded retraction device and a dog collar connection device is connected to the cord.

10 Claims, 11 Drawing Sheets

(56) References Cited

U.S. PATENT DOCUMENTS

| | | | | |
|---|---|---|---|---|
| 6,247,427 B1* | 6/2001 | DeBien | ............... | A01K 27/005 119/776 |
| 6,405,683 B1* | 6/2002 | Walter | ............... | A01K 27/004 119/772 |
| 6,450,558 B1* | 9/2002 | Ringrose | ............... | F16B 45/021 24/600.1 |
| 6,792,893 B1* | 9/2004 | Quintero | ............... | A01K 27/004 119/796 |
| 6,912,975 B1* | 7/2005 | Balan | ............... | A01K 27/004 119/796 |
| 7,340,926 B2* | 3/2008 | Kim | ............... | E05B 75/00 128/878 |
| 7,530,334 B1* | 5/2009 | Napolitano | ............... | A01K 27/005 119/769 |
| 8,001,663 B2* | 8/2011 | Belcourt | ............... | F16B 45/024 24/600.1 |
| 8,151,735 B1* | 4/2012 | McCrocklin | ............... | A01K 27/003 119/796 |
| 8,230,822 B2* | 7/2012 | Smith | ............... | A01K 27/004 119/796 |
| 8,978,593 B2* | 3/2015 | Catena | ............... | A01K 27/004 119/796 |
| 9,032,594 B1* | 5/2015 | Mitchell | ............... | F16B 45/024 24/601.5 |
| 9,107,394 B2* | 8/2015 | Geller | ............... | A01K 27/004 |
| 9,587,659 B1* | 3/2017 | D'Artell | ............... | D06F 55/00 |
| 10,034,460 B2* | 7/2018 | O'Brien | ............... | A01K 27/004 |
| 10,893,660 B2* | 1/2021 | Hill | ............... | B65H 75/4428 |
| 11,445,705 B2* | 9/2022 | Chung | ............... | B65H 75/4442 |
| 2003/0140871 A1* | 7/2003 | Levine | ............... | A01K 27/005 119/795 |
| 2006/0163412 A1* | 7/2006 | Szarkowski | ............... | B65H 75/4434 242/384 |
| 2006/0266300 A1* | 11/2006 | Perkitny | ............... | A01K 27/004 119/713 |
| 2008/0011895 A1* | 1/2008 | Bleshoy | ............... | B65H 75/4434 242/382.4 |
| 2008/0222859 A1* | 9/2008 | Chepurny | ............... | A61G 7/1049 5/81.1 R |
| 2008/0223308 A1* | 9/2008 | Stern | ............... | A01K 27/006 119/796 |
| 2011/0041778 A1* | 2/2011 | Le Croix | ............... | A01K 27/004 119/796 |
| 2011/0163195 A1* | 7/2011 | Bentz | ............... | B65H 75/406 242/388.6 |
| 2011/0315090 A1* | 12/2011 | Marshall | ............... | A01K 27/004 119/796 |
| 2012/0312252 A1* | 12/2012 | Lipke | ............... | A01K 27/004 119/796 |
| 2014/0132016 A1* | 5/2014 | Nommensen | ............... | F16B 45/023 294/82.19 |
| 2015/0047154 A1* | 2/2015 | DeBien | ............... | F16B 45/045 24/303 |
| 2016/0338323 A1* | 11/2016 | Nishida | ............... | A01K 27/004 |
| 2021/0045357 A1* | 2/2021 | Alexander | ............... | A01K 27/004 |
| 2021/0120783 A1* | 4/2021 | Bowden | ............... | B65H 75/406 |

FOREIGN PATENT DOCUMENTS

| | | | | |
|---|---|---|---|---|
| DE | 102006058641 A1 * | 6/2008 | ............ | A01K 27/004 |
| DE | 202009012663 U1 * | 2/2010 | ............ | A01K 27/004 |
| ES | 2322004 A1 | 6/2009 | ............ | A01K 27/00 |
| GB | 2059239 A * | 4/1981 | ............ | A01K 27/004 |
| GB | 2361166 A * | 10/2001 | ............ | A01K 27/004 |
| KR | 20140001965 U * | 4/2014 | | |
| WO | WO-2015076931 A1 * | 5/2015 | ............ | A01K 27/00 |

* cited by examiner

RETRACTABLE DOG LEASH WITH GRAVITY LOCKING MECHANISM

The present invention relates to dog walking devices, and in particular, to dog walking devices with a retractable leash.

BACKGROUND OF THE INVENTION

Domesticated dogs are found throughout the world. They offer companionship, protection and love for their families. Additionally, dogs can be trained to serve law enforcement, search and rescue organizations and the military. They work on farms and on ranches.

It is important that dog owners provide optimum care for their dogs. Dogs need to be properly fed, trained and exercised. Often it is very difficult to allow a dog to run free off-leash. It is very common for areas of society to require dogs to be on leashes while being walked. In many cases strict leash laws are enforced.

There are currently a variety of leashes available in the prior art available. Some of these leashes show the utilization of a retractable leash. However, some of these devices are cumbersome to operate with flimsy parts that can become fouled or break.

What is needed is a better retractable dog leash that is sturdy and easy to operate.

SUMMARY OF THE INVENTION

The present invention provides a retractable dog leash. The dog leash includes a cylindrical housing having a housing front cover and housing rear cover. A spring-loaded retraction device is positioned in the housing adjacent to the rear cover and a linear compression spring is positioned between the spring-loaded retraction device and the front cover. The spring-loaded retraction device includes a gravity locking device for locking the dog leash. A cord is connected to the spring-loaded retraction device and a dog collar connection device is connected to the cord.

BRIEF DESCRIPTION OF THE DRAWINGS

FIGS. 21A-22C show the operation of the spring-loaded retraction device.

DETAILED DESCRIPTION OF THE PREFERRED EMBODIMENTS

Figure 1:
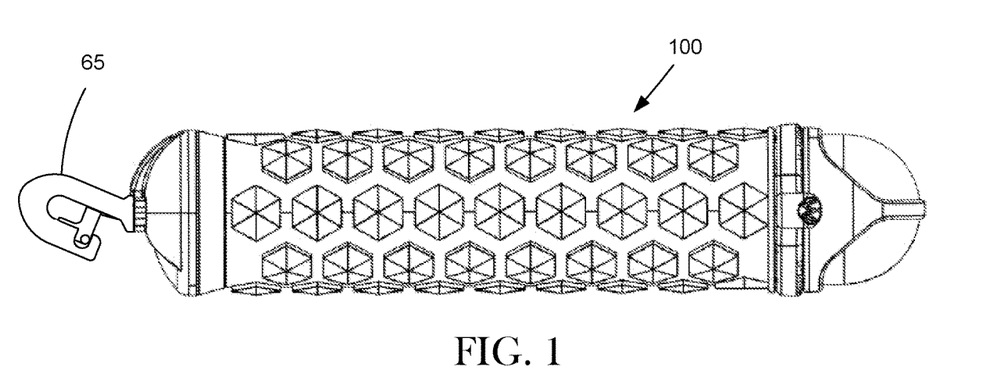
FIG. 1 shows a preferred retractable dog leash.

FIG. 1 shows preferred retractable dog leash 100. Retractable dog leash 100 includes magnetic-locking attachment clip 65.

Figure 2:
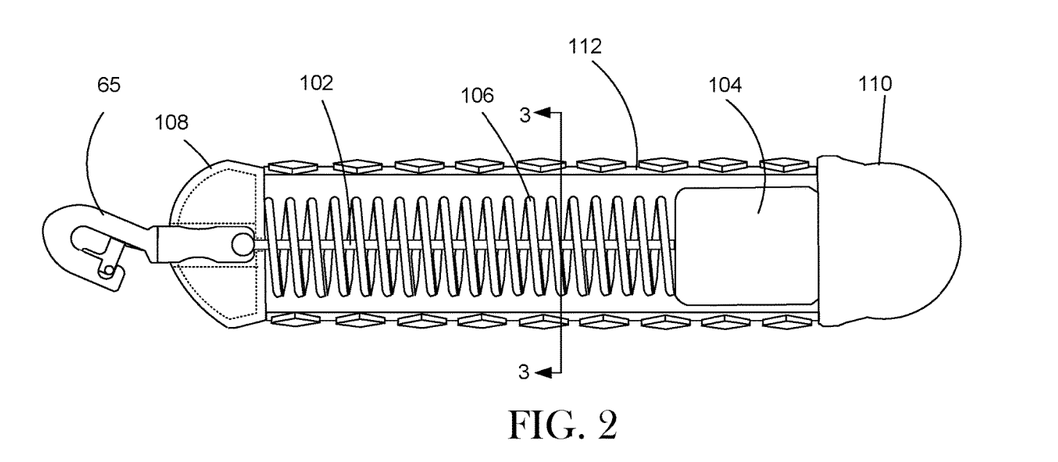
FIG. 2 shows a cutaway view of a preferred retractable dog leash.

FIG. 2 shows a cutaway view of dog leash 100. Clip 65 is connected to cord 102. Cord 102 is connected to spring loaded retraction device 104. Linear spring 106 is positioned between spring loaded retraction device 104 and front cover 108 and is biased to provide a compressive force against spring loaded retraction device 104. Rear cover 110 is connected to the rear of cylinder 112 and front cover 108 is connected to the front of cylinder 112.

Figure 3:
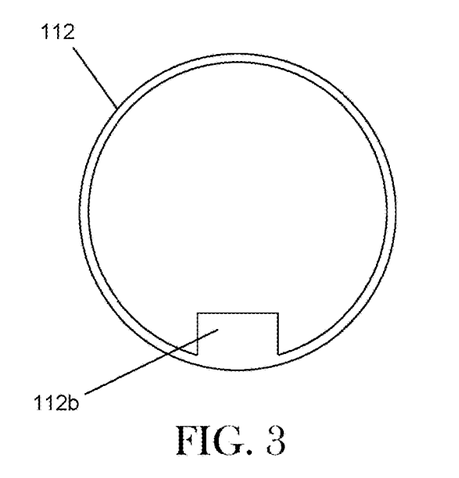
FIG. 3 shows a cross sectional view of a preferred cylinder.
Figure 4:
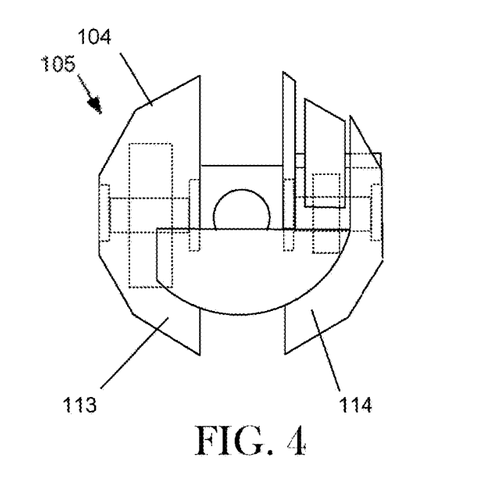
FIG. 4 shows a cross sectional view of a preferred spring-loaded retraction device.
Figure 4B:
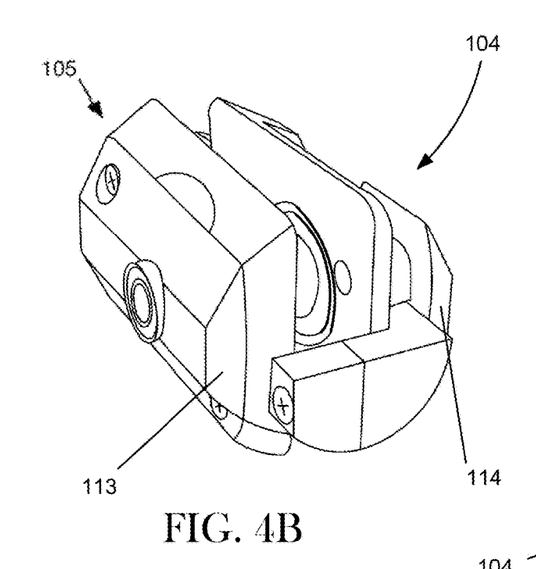
FIG. 4B shows a perspective view of a preferred spring-loaded retraction device.
Figure 5:
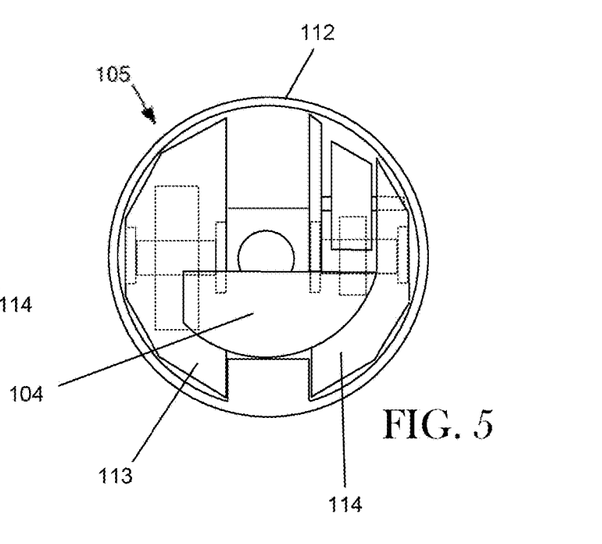
FIG. 5 shows the spring-loaded retraction device within the cylinder.

FIG. 3 shows a cutaway rear view of cylinder 112. It should be noted that in the preferred embodiment shown, cylinder 112 has a circular cross section with alignment track 112 *b*. As shown in FIGS. 4 and 4B, spring-loaded retraction device 104 includes a spring-loaded retraction device housing 105 that includes two sides, left side 113 and right side 114, which are mechanically joined. As shown, spring-retraction device 104 has the general shape of a twelve-sided polygon (FIG. 4). Spring-loaded retraction device is faceted to reduce the linear drag on its sidewalls while still allowing the retraction device 104 to slide easily between along track 112 *b* internal to cylinder 112. For example, FIG. 5 shows spring-loaded retraction device 104 placed inside cylinder 112. As shown, spring-loaded retraction device 104 is prevented from moving rotationally relative to cylinder 112 due to its positioning on alignment track 112 *b*. However, spring loaded retraction device 104 is free to slide linearly easily on alignment track 112 *b* within cylinder 112.

Figure 6:
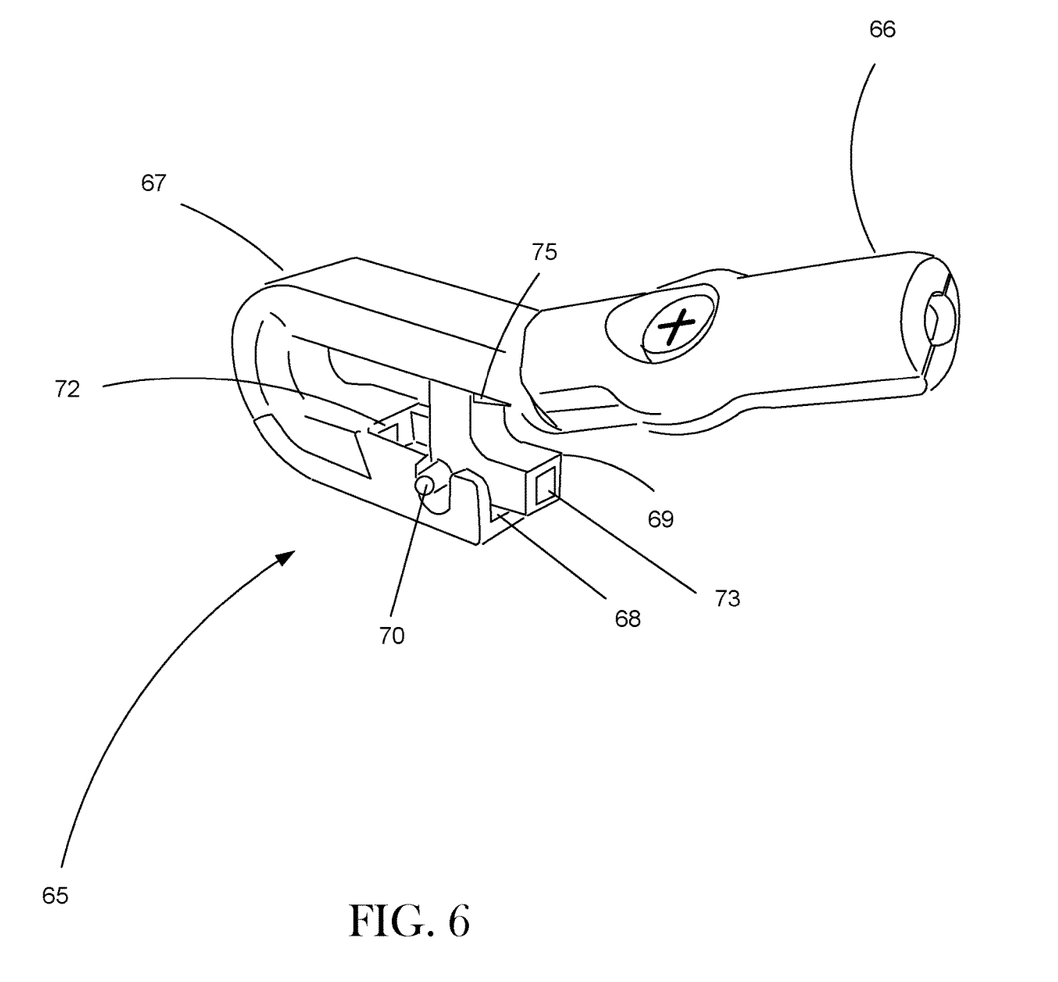
FIG. 6 shows a perspective view of a preferred magnetic-locking attachment clip.
Figure 7:
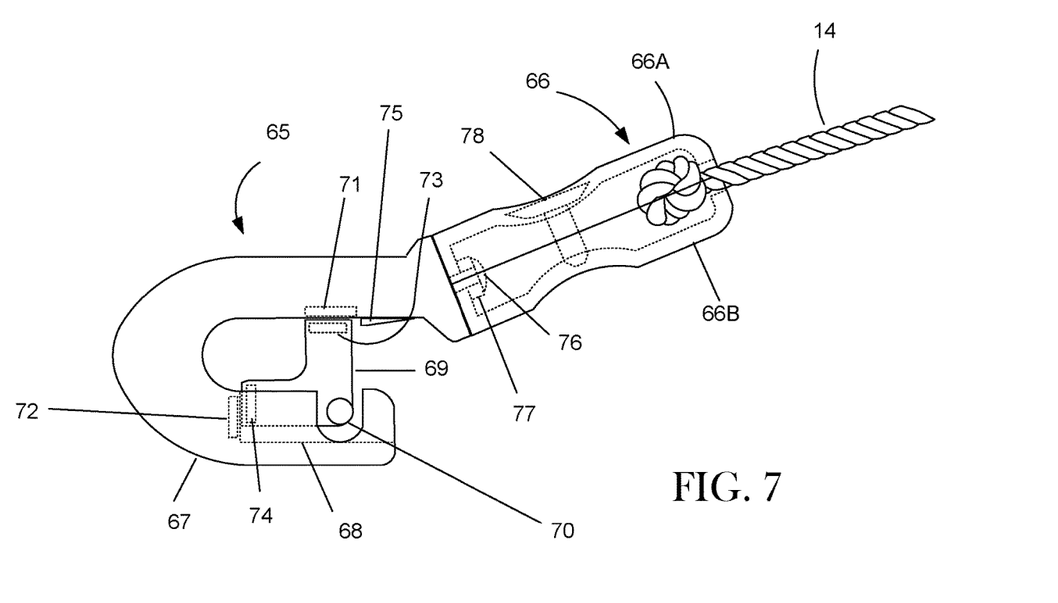
FIG. 7 shows a side view of a preferred magnetic-locking attachment clip.

FIG. 6 shows a perspective view and FIG. 7 shows a side view of magnetic-locking attachment clip 65. Attachment clip 65 includes cord cover section 66 for connection to cord 14 (FIG. 1). Clip section 67 is pivotally connected to cord cover section 66. Clip section 67 further includes magnets 71 and 72 arranged as shown. Clip section 67 also includes cutout section 68 that allows for the pivotal connection of L-shaped rocker 69. L-shaped rocker 69 includes pivot axle 70, and interacts with magnet 71 of clip section 67. Magnets 73 and 74 are attached to L-shaped rocker 69 and interact with magnets 71 and 72 of clip section 67. Ramp 75 prevents unwanted rotation of L-shaped rocker 69.

Pivot screw 76 is threaded into clip section 67. Cord cover section 66 pivots about the axis formed by pivot screw 76. Rubber washer 77 provides support for cord cover section 66. Upper cover 66A and lower cover 66B are joined together tightly by utilization of connection screw 78.

FIGS. 8-15 depict the utilization of magnetic-locking attachment clip 65.

Figure 8:
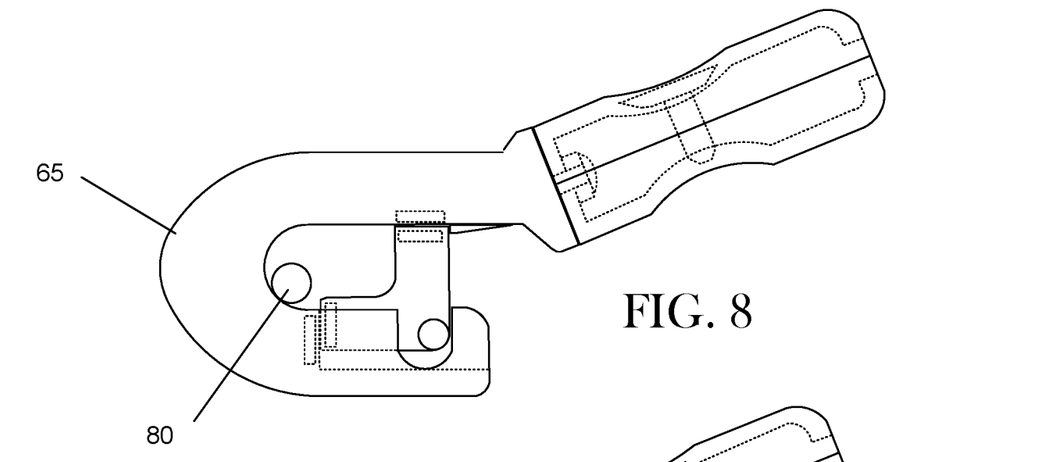
FIGS. 8-15 show the utilization of the magnetic-locking attachment clip.

FIG. 8 shows clip 65 connected to a dog's collar ring 80 (see also FIG. 1).

Figure 9:
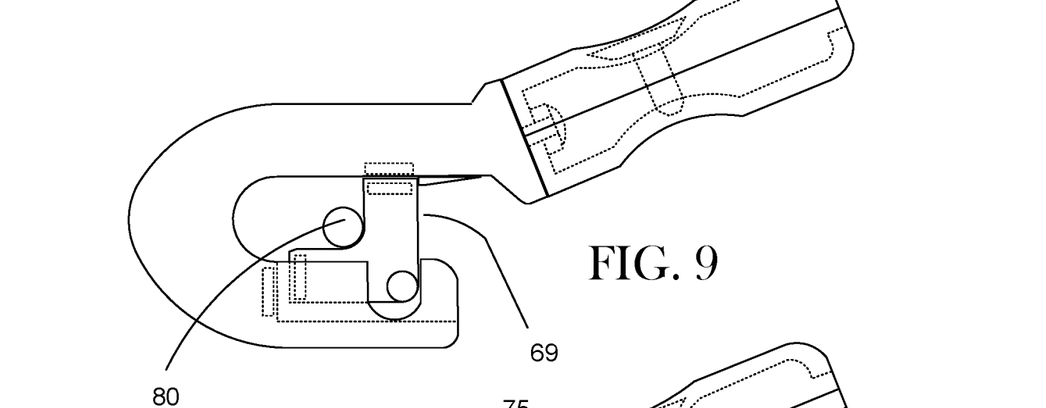

In FIG. 9, the user has decided that he wants to remove clip 65 from collar ring 80 and has moved collar ring 80 towards L-shaped rocker 69.

Figure 10:
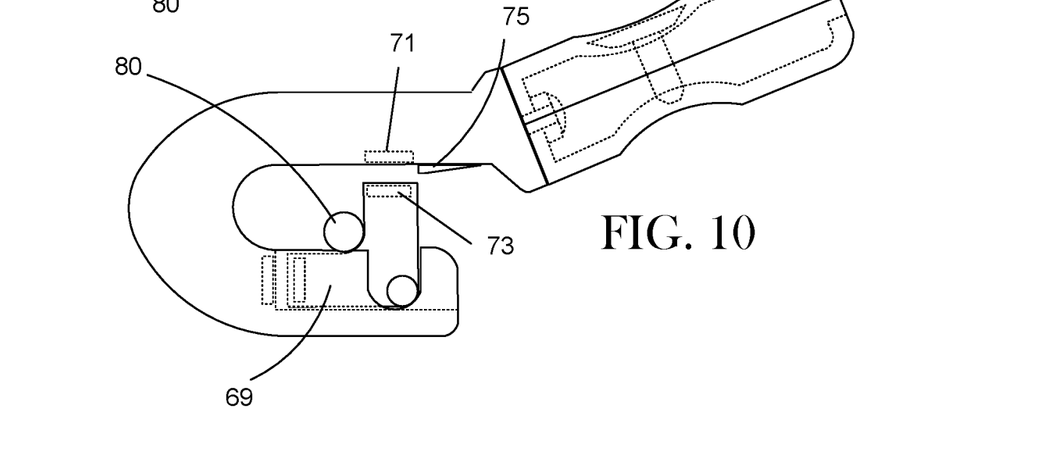

In FIG. 10 the user has used ring 80 to push down on L-shaped rocker 69 to overcome the magnetic attraction force between magnets 71 and 73 and to also clear ramp 75.

Figure 11:
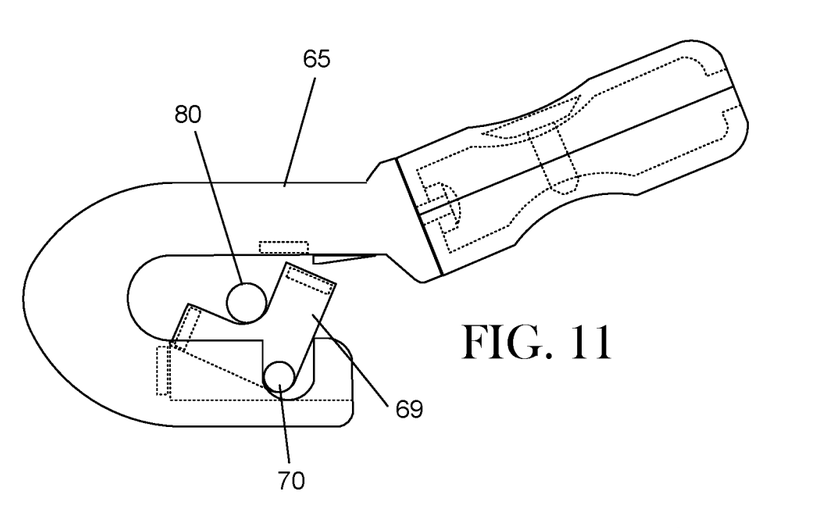

In FIG. 11 the user is continuing to pull ring 80 away from clip 65. L-shaped rocker 69 is rotating about pivot axle 70.

Figure 12:
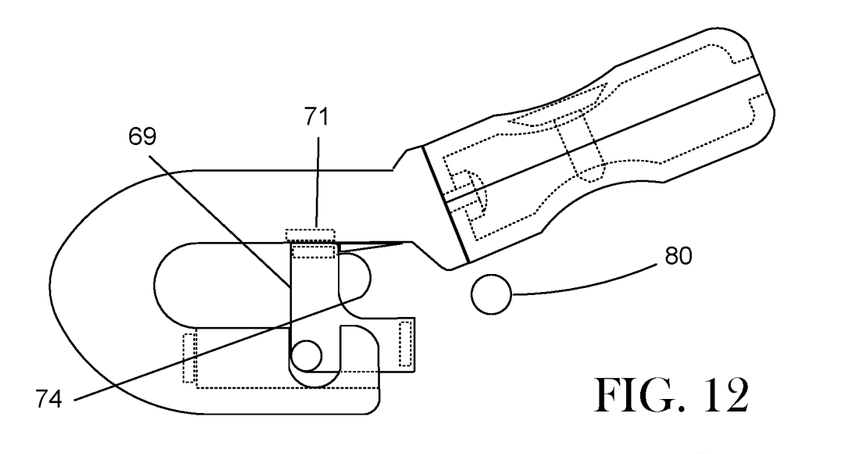

In FIG. 12 the user has removed ring 80 from clip 65. L-shaped rocker has completed rotated to the position shown and is held steady in place by the magnetic attraction between magnets 74 and 71.

Figure 13:
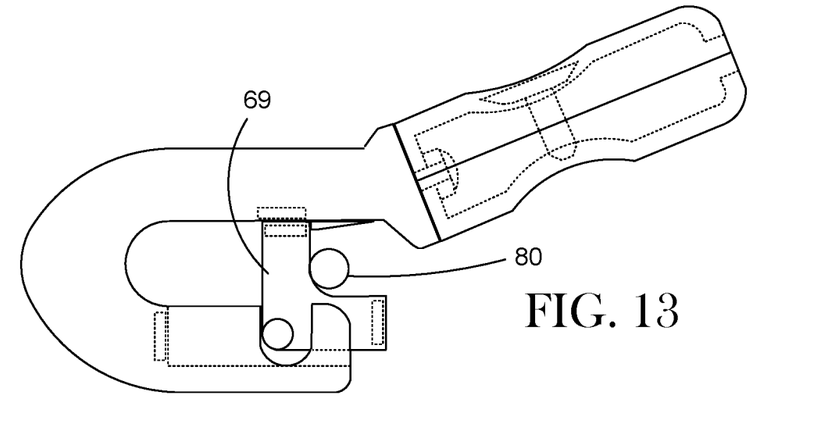

In FIG. 13 the user has decided to reattach clip 65 to ring 80 and has moved ring 80 towards L-shaped rocker 69.

Figure 14:
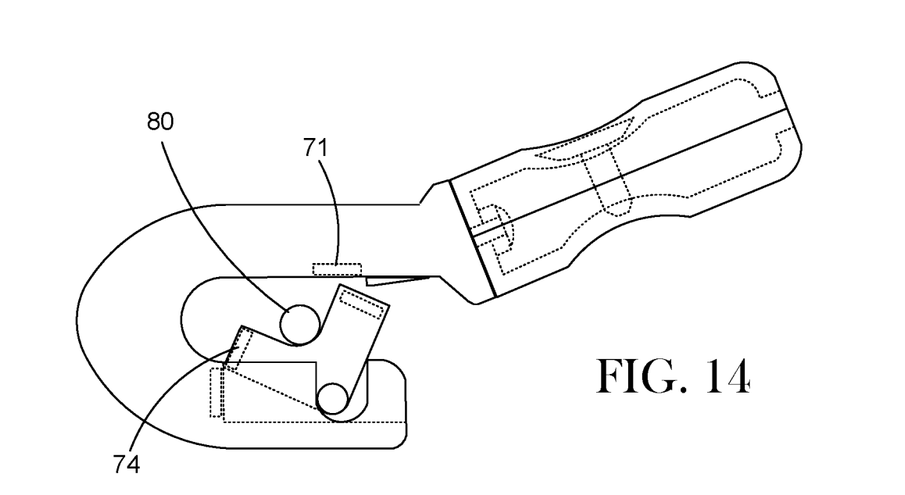

In FIG. 14 the user has push ring 80 further into clip 65 and has overcome the magnetic attraction force between magnets 71 and 74.

Figure 15:
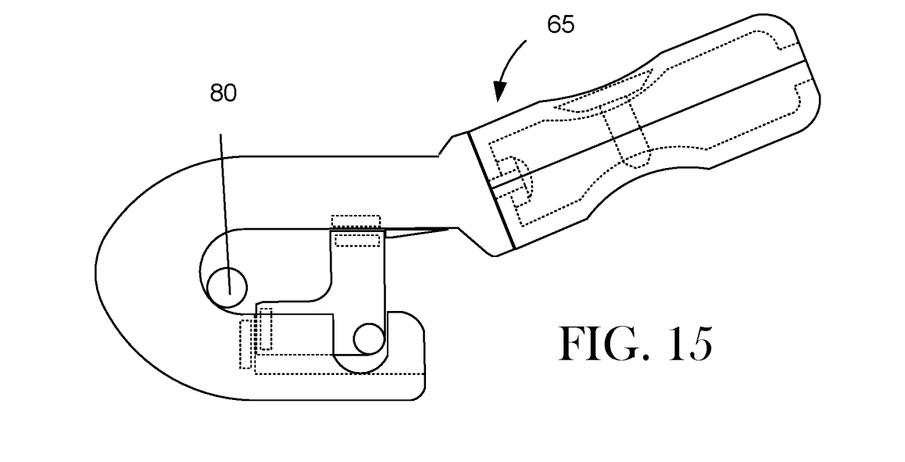

In FIG. 15 the user has completed connecting clip 65 to ring 80 so that clip 65 is in the position shown earlier in FIGS. 8 and 1.

Utilization of a Preferred Embodiment

Figure 16:
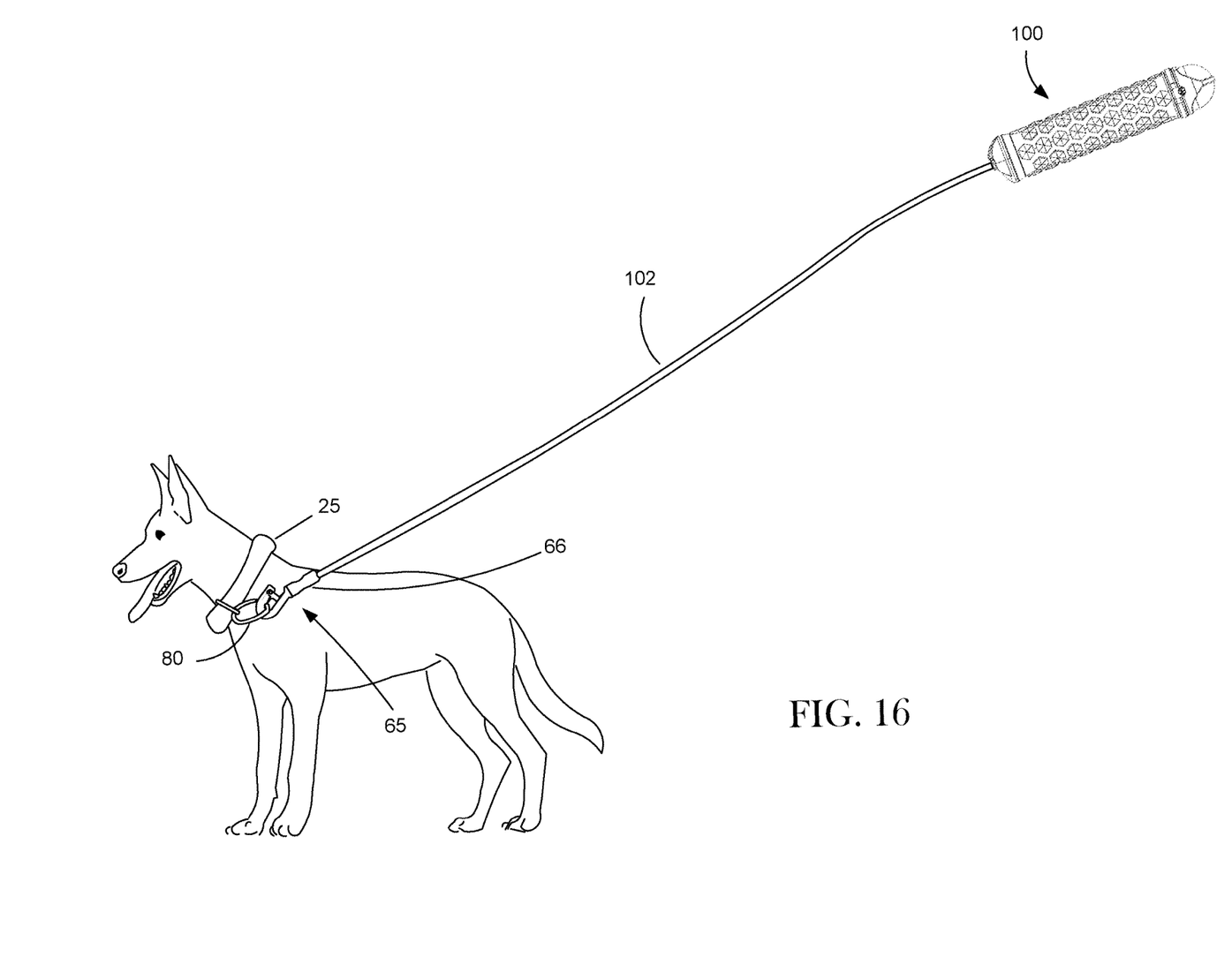
FIG. 16 shows the dog leash connected to a dog collar ring.
Figure 17:
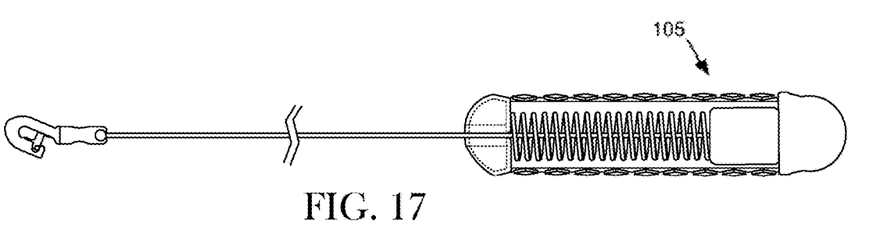
FIG. 17 shows internal components of the dog leash.
Figure 18:
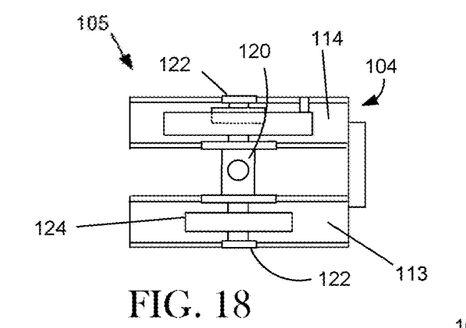
FIGS. 18-20 show the components of a preferred spring-loaded retraction device.
Figure 19:
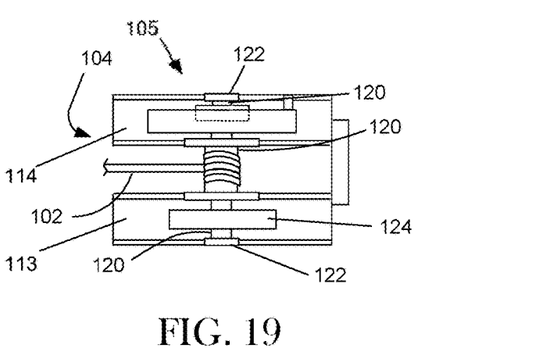
Figure 20:
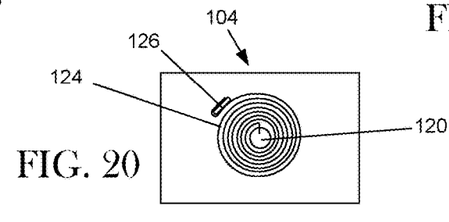

In FIG. 16 the user has connected clip 65 to collar ring 80. Cord 102 is connected to clip 65 at one end and is connected to and wound around axle 120 of spring-loaded retraction device 104 (FIGS. 17-18). Axle 120 extends through spring-loaded retraction device 104 and rides on bearings 122 as shown. Spring-loaded retraction device 104 includes coil spring 124. Coil spring 124 is connected between axle 120 and connection tab 126. Connection tab 126 is rigidly connected to spring-loaded retraction device 104. Coil spring 124 is biased to wind clip 65 inward to cylinder 112 to the position shown in FIGS. 1 and 2.

In FIG. 16 the user has initially allowed the dog to walk and pull on cord 102 to overcome the retraction force of coil spring 124. The dog is shown at a distance that is comfortable for the user and the dog. The user has then decided that he does not want the dog to have a longer leash. Therefore, the user has decided to lock spring-loaded retraction device 104 so that no further cord 102 will be played out.

Figures 21A, 21B:
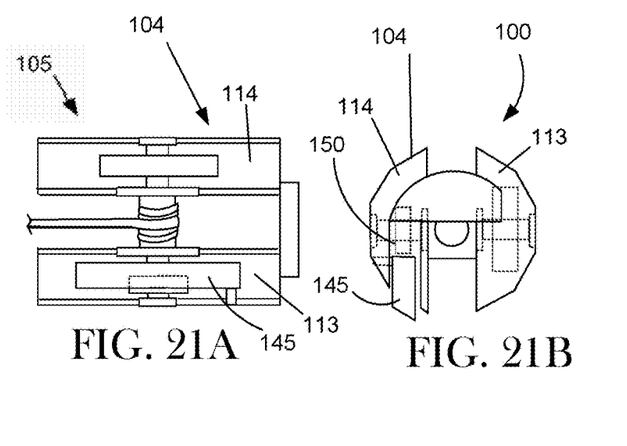
Figure 21C:
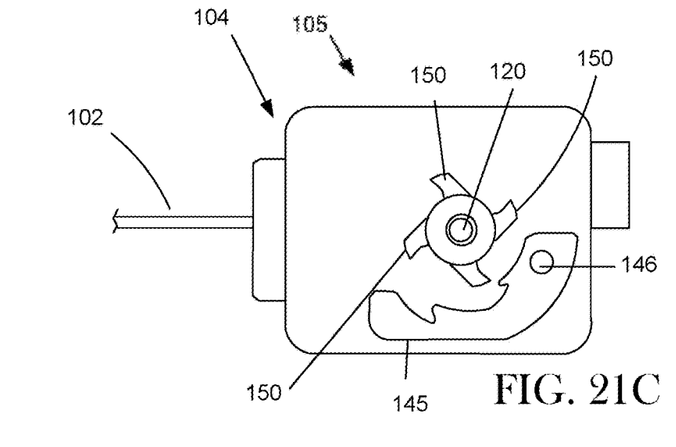

To lock spring-loaded retraction device 104, the user rotates dog leash 100 180 degrees. For example, FIG. 21A-21C show a top view, rear view and side view of spring-loaded retraction device 104. Spring-loaded retraction device 104 includes pivotally attached gravity locking bar 145. Gravity locking bar 145 is pivotally connected via pivot pin 146 to spring-loaded retraction device 104.

Figure 22A:
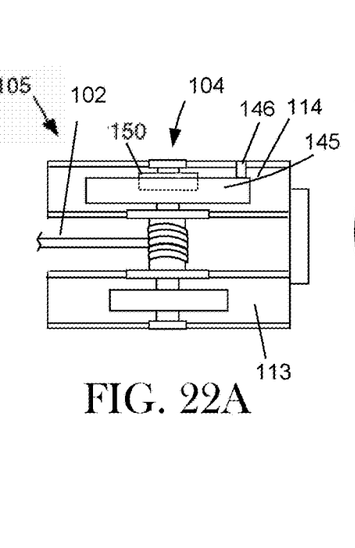
Figure 22B:
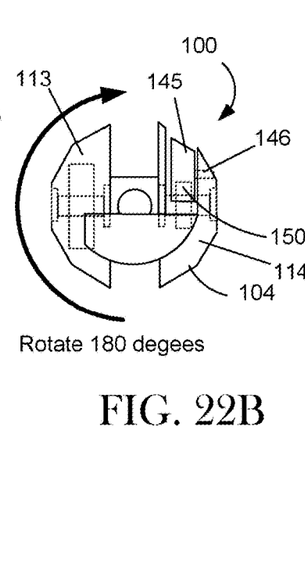

In FIGS. 21A-21C, the user has decided to keep dog leash 100 unlocked. Therefore, the user is holding dog leash 100 in the position shown so that gravity locking bar 145 dangles freely below locking blades 150. Locking blades 150 are rigidly connected to axle 120. Axle 120 rotates counter-clockwise (FIG. 21C) to play out cord 102 to allow the leash to expand as desired. In the position shown in FIGS. 21A-21C, there is no locking of axle 120 and cord 102 is free to expand or contract In FIGS. 22A-22C, the user has decided to lock dog leash 100 and that he does not want the distance of cord 102 to play out any further. Therefore, the user has rotated dog leash 100 180 degrees. Likewise, spring-loaded retraction device 104 is rotated 180 degrees (FIG. 22B). Consequently, the force of gravity causes gravity locking bar 145 to rotate counterclockwise about pivot pin 146 and thereby meshing with locking blades 150 to stop the clockwise (FIG. 22C) rotation of axle 120. Therefore, cord 102 is prevented from further pay out and dog leash 100 is locked.

Figure 22C:
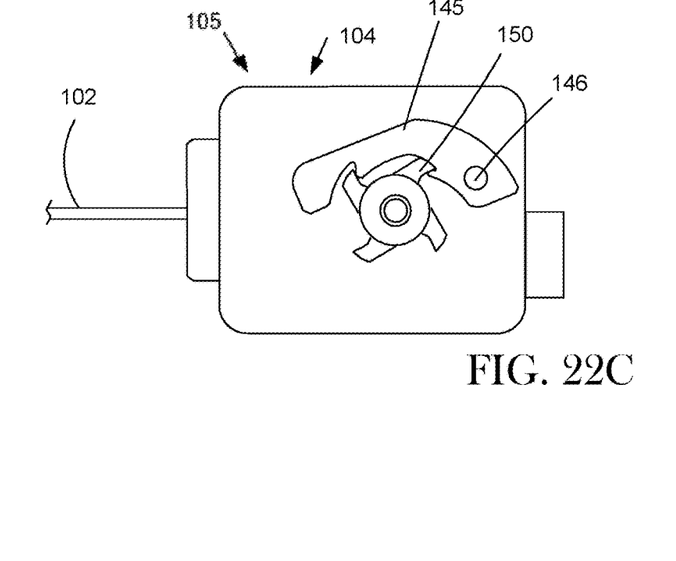

It should be noted that while clockwise rotation of axle 120 has been stopped in FIG. 22C, counterclockwise motion is permitted thereby allowing coil spring 124 to retract cord 102 as the distance between the user and the dog decreases. In other words, the interface of gravity locking bar 145 in relation to locking blades 150 is such that while the device is locked, the radial force of coil spring 124 can overcome the surface friction between the interface points of locking bar 145 and locking blades 150. Therefore, gravity locking bar 145 can rotate radially out of its locking position to allow counterclockwise rotation of locking blades 150 to permit the retraction of cord 102 when there is a reduced tension on the cord. Conversely, when the cord tension of cord 102 increases beyond the strength of coil spring 124, locking bar 145 once again meshes with locking blades 150 to stop the clockwise (FIG. 22C) rotation of axle 120.

To unlock dog leash 100 once again the user only needs to rotate dog leash 100 180 degrees to put it in the position shown in FIGS. 21A-21C.

Figure 23:
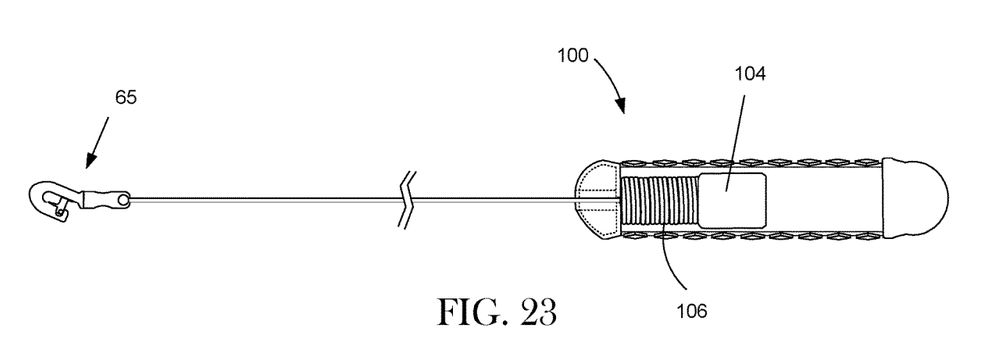
FIG. 23 shows the compression of the linear spring for shock absorption.

In FIG. 23 the user has locked leash 100. However, the dog has pulled on leash 100 causing attachment clip 65 to move further to the left. Spring-loaded retraction device 104 has slid linearly within cylinder 112. This causes linear compression spring 106 to compress thereby providing shock absorption to the user and the dog for comfort and safety.

While the present invention has been described in terms of preferred embodiments, the reader should consider these described embodiments only as particular embodiments. Many other embodiments are possible. Therefore, the reader should determine the scope of the present invention by the claims and their legal equivalents.

What is claimed is:

1. A retractable dog leash, comprising:
  a housing, a spring-loaded retraction device positioned inside of said housing, said spring-loaded retraction device including an axle rotatably connected to said spring-loaded retraction device, a gravity locking device configured with said spring-loaded retraction device, a cord connected to said axle of said spring-loaded retraction device;
  a retractable coil spring connected between said axle and said spring-loaded retraction device, said coil spring biased to wind in said cord, wherein said gravity locking device is a gravity locking device that comprises:
  i. locking blades rigidly connected to said axle, and
  ii. a locking bar pivotally connected to a spring-loaded retraction device housing, wherein by rotating said housing of said retractable dog leash, gravitational force causes said locking bar to either reversibly engage said locking blades to lock said dog leash or become reversibly disengaged with said locking blades to unlock said dog leash; and
  iii. wherein, when the gravitational force causes said locking bar to engage said locking blades to lock said dog leash, said retractable coil spring is configured to cause said locking bar to rotate radially out of its locking position to permit retraction of the cord.

2. The retractable dog leash as in claim 1, wherein said housing is a cylindrical housing that comprises a circular cross section and an alignment track to prevent relative rotational motion but allow relative linear motion between said cylindrical housing and said spring-loaded retraction device.

3. The retractable dog leash as in claim 1, wherein said spring-loaded retraction device has a shape of a polygon.

4. The retractable dog leash as in claim 3, wherein said spring-loaded retraction device has the shape of a twelve-sided polygon.

5. The retractable dog leash as in claim 1, wherein said spring-loaded retraction device comprises:
  a spring-loaded retraction device housing, and
  a retractable coil spring connected between said axle and said spring-loaded retraction device housing.

6. The retractable dog leash as in claim 1, wherein the spring-loaded retraction device is positioned inside of said housing, where said spring-loaded retraction device is configured to move longitudinally inside of said housing.

7. The retractable dog leash as in claim 6 further comprising a linear compression spring positioned between said a housing front cover and said spring-loaded retraction device, said linear compression spring is configured to bias said spring-loaded retraction device away from said housing front cover, wherein, said linear compression spring is configured to provide shock absorption to the cord connected to said spring-loaded retraction device.

8. The retractable dog leash as in claim 1, wherein, by rotating the housing of the dog leash 180 degrees, the gravitational force causes said locking bar to either reversibly engage said locking blades to lock said dog leash or become reversibly disengaged with said locking blades to unlock said dog leash.

9. The retractable dog leash as in claim 1, wherein the gravitational force causes a downward rotational force of the locking bar to interact with the locking blades thereby stopping rotational movement of the locking blades.

10. The retractable dog leash as in claim 9, wherein the downward rotational force of the locking bar combined with increasing a rotational force of the locking blades is configured to promote an additional downward force of the locking bar thereby further resisting rotation of the locking blades.

* * * * *